US011960159B2

United States Patent
Kim et al.

(10) Patent No.: US 11,960,159 B2
(45) Date of Patent: Apr. 16, 2024

(54) POLYAMIDEIMIDE FILM AND FLEXIBLE DISPLAY PANEL INCLUDING THE SAME

(71) Applicants: SK Innovation Co., Ltd., Seoul (KR); SK IE Technology Co., Ltd., Seoul (KR)

(72) Inventors: Hyeon Jeong Kim, Daejeon (KR); Hye Ri Kim, Daejeon (KR); Se Rah Moon, Daejeon (KR); Sang Yoon Park, Daejeon (KR); Hyo Shin Kwak, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 146 days.

(21) Appl. No.: 17/233,652

(22) Filed: Apr. 19, 2021

(65) Prior Publication Data
US 2021/0324146 A1 Oct. 21, 2021

(30) Foreign Application Priority Data
Apr. 20, 2020 (KR) .................. 10-2020-0047622

(51) Int. Cl.
G02F 1/1333 (2006.01)
C08G 73/10 (2006.01)
C08G 73/14 (2006.01)
G09F 9/30 (2006.01)
G06F 1/16 (2006.01)

(52) U.S. Cl.
CPC ... G02F 1/133331 (2021.01); C08G 73/1039 (2013.01); C08G 73/1042 (2013.01); C08G 73/1078 (2013.01); C08G 73/14 (2013.01); G09F 9/301 (2013.01); C08J 2379/08 (2013.01); C09K 2323/03 (2020.08); G06F 1/1652 (2013.01)

(58) Field of Classification Search
CPC .............. C08G 73/14; C08G 73/1039; C08G 73/1078; C08G 73/1072; C09K 2323/03; G06F 1/1637; G06F 1/1652; C08L 2203/16; C08J 5/18; C08J 2379/08; G09F 9/301
See application file for complete search history.

(56) References Cited

U.S. PATENT DOCUMENTS

| 10,738,173 | B2 | 8/2020 | Chae et al. |
| 10,815,378 | B2 | 10/2020 | Kim et al. |
| 2017/0183462 | A1* | 6/2017 | Song .................. C09J 7/25 |
| 2018/0230278 | A1 | 8/2018 | Han et al. |
| 2019/0010292 | A1 | 1/2019 | Yun et al. |
| 2019/0033494 | A1 | 1/2019 | Kim et al. |
| 2019/0077960 | A1* | 3/2019 | Kim .................. C08G 73/1039 |
| 2019/0135980 | A1 | 5/2019 | Jeon et al. |
| 2020/0024401 | A1 | 1/2020 | Ryu et al. |

FOREIGN PATENT DOCUMENTS

| JP | H7268097 | A | 10/1995 |
| JP | H1149858 | A | 2/1999 |
| JP | 2004107412 | A | 4/2004 |
| JP | 4918025 | B2 | 4/2012 |
| JP | 6164070 | B2 | 7/2017 |
| JP | 201886802 | A | 6/2018 |
| KR | 1020170132499 | A | 12/2017 |
| KR | 1020180018307 | A | 2/2018 |
| KR | 101839293 | B1 | 3/2018 |
| KR | 20180071007 | A * | 6/2018 ....... G02F 1/133305 |
| KR | 1020180093655 | A | 8/2018 |
| KR | 1020180131378 | A | 12/2018 |
| KR | 1020190012847 | A | 2/2019 |
| KR | 1020190029110 | A | 3/2019 |
| KR | 1020190050597 | A | 5/2019 |
| KR | 1020190090300 | A | 8/2019 |
| KR | 102055476 | B1 | 12/2019 |
| KR | 102247146 | B1 * | 5/2021 ............. G09F 9/301 |

* cited by examiner

Primary Examiner — Sophie Hon
(74) Attorney, Agent, or Firm — The Webb Law Firm

(57) ABSTRACT

Provided are a polyamideimide film, a window cover film, and a display panel including the same. More specifically, a polyamideimide film including an amideimide structure derived from a dianhydride, a diamine, and an aromatic diacid dichloride is provided, wherein a chlorine content in the film is 5 to 33 ppm and a yellow index change amount $\Delta YI$ is 5 or less, the yellow index change amount being measured in accordance with ASTM E313 after repeating a process of irradiating 0.55 W/m² of UVA at 340 nm at 40° C. for 20 hours and then blocking UVA for 4 hours three times.

11 Claims, No Drawings

POLYAMIDEIMIDE FILM AND FLEXIBLE DISPLAY PANEL INCLUDING THE SAME

CROSS-REFERENCE TO RELATED APPLICATION

This application claims priority to Korean Patent Application No. 10-2020-0047622 filed Apr. 20, 2020, the disclosure of which is hereby incorporated by reference in its entirety.

BACKGROUND OF THE INVENTION

Field if the Invention

The following disclosure relates to a polyamideimide film, a window cover film, and a display panel including the same.

Description of Related Art

A thin display such as a liquid crystal display or an organic light emitting diode display is implemented in the form of a touch screen panel and is widely used in various smart devices characterized by portability including various wearable devices as well as smart phones and tablet PCs.

These portable touch screen panel-based displays are provided with a window cover for display protection on a display panel for protecting a display panel from scratches or external impact, and in recent years, since a foldable display device having flexibility to be folded and unfolded has been developed, the material of the window cover has been changed from glass to a film made of plastic.

Among them, a polyimide-based resin is colored yellow or brown due to a high aromatic ring density, so as to have a low light transmittance in the visible light region and have a yellowish color, and thus, a trying to solve the above problems for using the polyimide-based resin as an optical film, specifically a window cover film of a display panel is being studied.

However, it has a yellow index of 4 or more and is insufficient to satisfy the physical properties required in the market, and when exposed to ultraviolet rays, yellowing rapidly occurs. In addition, deterioration of thermal resistance and mechanical properties occurs even when transparency is increased.

RELATED ART DOCUMENTS

[Patent Documents]
Korean Patent Registration Publication No. 10-2055476 (Dec. 6, 2019)

SUMMARY OF THE INVENTION

An embodiment of the present invention is directed to providing a film which has excellent physical properties and thermal resistance with excellent transparency, has a low yellow index of 4 or less, and has a small change of the yellow index, specifically a yellow index change of 5 or less, even in the case of long-term exposure to ultraviolet rays, specifically, after a UV weathering accelerated test.

Another embodiment of the present invention is directed to providing a film which has excellent flexibility and is not deformed and/or damaged even with repetitive bending, and thus, may be applied as a window cover film of a flexible display.

In one general aspect, a polyamideimide film includes an amideimide structure derived from a dianhydride, a diamine, and an aromatic diacid dichloride, wherein a chlorine content in the film is 5 to 33 ppm and a yellow index change amount $\Delta YI$ satisfies the following equation, the yellow index change amount being measured in accordance with ASTM E313 after repeating a process of irradiating 0.55 W/m$^2$ of UVA at 340 nm at 40° C. for 20 hours and then blocking UVA for 4 hours three times:

$$\Delta YI \leq 5 \qquad \text{[Equation 1]}$$

wherein $\Delta YI$ is a yellow index after a UV weathering accelerated test—an initial yellow index.

In an exemplary embodiment, the polyamideimide film may have the initial yellow index of 4 or less.

In an exemplary embodiment, the polyamideimide film may have the initial yellow index of 2 or less and the $\Delta YI$ of 4 or less.

In an exemplary embodiment, a content of the aromatic diacid dichloride may be 20 to 80 mol with respect to 100 mol of the diamine.

In an exemplary embodiment, the polyamideimide film may have a modulus in accordance with ASTM D882 of 4 GPa or more and an elongation at break of 8% or more.

In an exemplary embodiment, the polyamideimide film may have a light transmittance of 5% or more as measured at 388 nm in accordance with ASTM D1746, a total light transmittance of 87% or more as measured at 400 to 700nm, a haze of 2.0% or less, and a b* value of 2.0 or less.

In an exemplary embodiment, the diamine may include a fluorine-based aromatic diamine.

In an exemplary embodiment, the dianhydride may include an aromatic dianhydride and a cycloaliphatic dianhydride.

In an exemplary embodiment, 10 to 50 mol of the aromatic dianhydride and 10 to 60 mol of the cycloaliphatic dianhydride may be included with respect to 100 mol of the diamine.

In an exemplary embodiment, the cycloaliphatic dianhydride may include cyclobutanetetracarboxylic dianhydride (CBDA).

In an exemplary embodiment, a sum of the aromatic diacid dichloride and the dianhydride to the diamine may have a mole ratio of 1:0.9 to 1.1.

In an exemplary embodiment, the polyamideimide film may be formed of a block polyamideimide structure.

In an exemplary embodiment, the polyamideimide film may include a fluorine-based aromatic diamine-derived unit, an aromatic dianhydride-derived unit, a cycloaliphatic dianhydride-derived unit, and an aromatic diacid dichloride-derived unit.

In an exemplary embodiment, the polyamideimide film may have a thickness of 10 to 500 μm.

In another general aspect, a window cover film includes:
the polyamideimide film according to the above exemplary embodiment; and
a coating layer formed on one surface or both surfaces of the polyamideimide film.

In an exemplary embodiment, the coating layer may be any one or more selected from a hard coating layer, an antistatic layer, an anti-fingerprint layer, an antifouling layer, an anti-scratch layer, a low-refractive layer, an antireflective layer, and a shock absorption layer.

In still another general aspect, a flexible display panel includes the polyamideimide film according to the above exemplary embodiment.

Other features and aspects will be apparent from the following detailed description, the drawings, and the claims.

DESCRIPTION OF THE INVENTION

Hereinafter, the present invention will be described in more detail. However, the following exemplary embodiments are only a reference for describing the present invention in detail, and the present invention is not limited thereto, and may be implemented in various forms.

In addition, unless otherwise defined, all technical terms and scientific terms have the same meanings as those commonly understood by those skilled in the art to which the present invention pertains. The terms used herein are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

In the present invention, a "film" is obtained by applying and drying a "polyamideimide-based resin solution" on a substrate and carrying out peeling off, and may be stretched or unstretched.

Hereinafter, the present invention will be described.

The inventors of the present invention conducted many studies for solving the above problems, and as a result, found that when a divalent acid organic compound having a chloroacyl group is used to prepare polyamideimide, a film which, unusually, has a low yellow index, is less yellowed even in the case of long-term exposure to ultraviolet rays, and also has physical properties of excellent mechanical physical properties and transparency, may be provided, in a range in which a chlorine content in the final film is 5 to 33 ppm, thereby completing the present invention.

It was confirmed in the present invention that the composition and the production method are not limited as long as a film is less yellowed, specifically as long as a yellow index change amount ΔYI of the film is 5 or less, the yellow index change amount being measured in accordance with ASTM E313 after repeating a process of irradiating 0.55 W/m² of UVA at 340 nm at 40° C. for 20 hours and then blocking UVA for 4 hours three times; however, as an example of one means for obtaining the physical properties, a film which, in a range of including an aromatic diacid dichloride as a monomer and a chlorine content in a final film of 5 to 33 ppm, unusually has a low yellow index in a range of 4 or less, preferably 3 or less, and more preferably 1 to 2, is less yellowed even in the case of long-term exposure to ultraviolet rays, and has physical properties of excellent mechanical physical properties and transparency, may be provided.

In the present invention, it was confirmed that in a range of a chlorine content more than 33 ppm, the yellow index is increased to 2 or more, a yellow index change rate after exposure to ultraviolet rays is rapidly increased, and the mechanical physical properties are lowered.

In addition, when a chlorine content is less than 5 ppm, or when the diacid dichloride is not used as a monomer to have a chlorine content of less than 5 ppm, transparency and mechanical physical properties are rather deteriorated, and, in particular, the yellow index change rate is increased after UV irradiation, which is thus not preferred.

Therefore, it was found that when the chlorine content is controlled to 5 to 33 ppm while using the diacid dichloride as a monomer, the yellow index and the yellow index change rate of the present invention are low, thereby completing the present invention.

The chlorine content is adjusted by preparing an oligomer while using a sufficient amount of the diacid dichloride as a monomer and then performing purification or preparing a polyamic acid, imidizing the polyamic acid, performing purification, and performing drying in vacuo in a drying step, or the chlorine content is adjusted to the above content by various means, and in such case, the effect to be desired in the present invention may be achieved, and thus, the means for adjusting the chlorine content is not particularly limited.

Preferably, the chlorine content may be easily controlled to the range by a method such as using a polymerization composition including the diacid dichloride as a monomer to prepare an intermediate polymer in a polyamic acid oligomer and purifying the polymer, but the present invention is not limited thereto.

In the present invention, it is significant to confirm that when a polyamideimide including the diacid dichloride as a monomer is prepared, in the case of the content of a chlorine element of 5 to 33 ppm, the yellow index is low, a change in the yellow index is small even after maintaining the polymer in ultraviolet rays for a long time, and the mechanical physical properties and transparency are excellent.

It is also possible to mix and polymerize the aromatic diacid dichloride, a diamine, and a dianhydride, without preparing an intermediate first as in the present invention, imidize the polymer to prepare a random polyamideimide resin, and then perform purification of chlorine, but in such case, much energy is input in a purification step or vacuum drying step, which is thus not preferred; however, this is not excluded from the present invention.

In addition, even when compared with the case having no chlorine like the related art, the present invention having the above chlorine content has better characteristics in the yellow index change rate even with the same polymer structure, and thus, has better retention rate of the mechanical physical properties under an environment such as long-term exposure to ultraviolet rays.

Hereinafter, the present invention will be described in more detail.

<Polyamideimide Film>

In an exemplary embodiment of the present invention, a polyamideimide film includes an amideimide structure derived from a dianhydride, a diamine, and an aromatic diacid dichloride, wherein a chlorine content in the film is 5 to 33 ppm and a yellow index change amount ΔYI satisfies the following equation, the yellow index change amount being measured in accordance with ASTM E313 after repeating a process of irradiating 0.55 W/m² of UVA at 340 nm at 40° C. for 20 hours and then blocking UVA for 4 hours three times. In addition, within a range of the yellow index change amount of 5 or less, more preferably 4 or less, and still more preferably 3 or less, a film having good weatherability and a less change in mechanical physical properties may be provided:

$$\Delta YI \leq 5 \qquad \text{[Equation 1]}$$

wherein ΔYI is a yellow index after a UV weathering accelerated test—an initial yellow index.

In addition, an initial yellow index in accordance with ASTM D882 may be 4 or less, preferably 3 or less, more preferably 0.1 to 3, and still more preferably 0.1 to 2.

In an exemplary embodiment of the present invention, the polyamideimide film may have a modulus in accordance with ASTM D882 of 3 GPa or more, 4 GPa or more, or 5 GPa or more, and more preferably 7 GPa or more, and an elongation at break of 8% or more, 12% or more, or 15% or more.

In an exemplary embodiment of the present invention, the polyamideimide film may have a light transmittance of 5% or more or 5 to 80% as measured in accordance with ASTM D1746 and a total light transmittance of 87% or more, 88% or more, 89% or more, or 90% or more, a haze of 2.0% or less, 1.5% or less, or 1.0% or less as measured in accordance with ASTM D1003, and a b* value of 2.0 or less, 1.3 or less, or 0.4 to 1.3 as measured in accordance with ASTM E313.

In an exemplary embodiment of the present invention, the polyamideimide film may have a thickness of 10 to 500 μm, 20 to 250 μm, or 30 to 100 μm.

In an exemplary embodiment of the present invention, the polyamideimide film may include a fluorine atom and an aliphatic cyclic structure, and thus, may have excellent mechanical physical properties and dynamic bending properties.

The polyamideimide resin of the present invention is not particularly limited, but is described in the following based on Example 1 in the present invention.

As an exemplary embodiment of the present invention, as in Example 1, a method of preparing a polyamideimide-based resin including a fluorine atom and an aliphatic cyclic structure may be as follows as an example, but the present invention is not limited thereto.

First, an amine-terminated polyamide oligomer derived from a first fluorine-based aromatic diamine and an aromatic diamide dichloride is prepared, and the amine-terminated polyamide oligomer, a second fluorine-based aromatic diamine, an aromatic dianhydride, and a cycloaliphatic dianhydride are polymerized to prepare a polyamideimide polymer.

The first fluorine-based aromatic diamine and the second fluorine-based aromatic diamine may be the same or different kinds.

In an exemplary embodiment of the present invention, when the amine-terminated oligomer having an amide structure in a polymer chain formed by the aromatic diacid dichloride is included as the monomer of the diamine, not only optical physical properties but also, in particular, mechanical strength including the modulus may be improved, and also the dynamic bending properties may be further improved.

In an exemplary embodiment of the present invention, when the polyamide oligomer block is included, a mole ratio between a diamine monomer including the amine-terminated polyamide oligomer and the second fluorine-based aromatic diamine and a dianhydride monomer including the aromatic dianhydride and the cycloaliphatic dianhydride of the present invention may be preferably 1:0.8 to 1.1, more preferably 1: 0.9 to 1, and still more preferably 1:1.

In addition, though a content of the amine-terminated polyamide oligomer with respect to the entire diamine monomer is not particularly limited, 20 mol % or more, preferably 50 mol % or more, more preferably 70 mol % or more, and more specifically 20 to 80 mol % are preferred for satisfying the mechanical physical properties, the yellowness, and the optical properties of the present invention.

In addition, a composition ratio of the aromatic dianhydride and the cycloaliphatic dianhydride is not particularly limited, but a ratio of 20 to 80 mol %:80 to 20 mol % is preferred considering the transparency, the yellowness, and the mechanical physical properties of the present invention, but the present invention is not necessarily limited thereto.

In an exemplary embodiment of the present invention, as the fluorine-based aromatic diamine component, a mixture of 2,2'-bis(trifluoromethyl)-benzidine and another known aromatic diamine component may be used, or 2,2'-bis(trifluoromethyl)-benzidine may be used alone.

By using the fluorine-based aromatic diamine as such, excellent optical properties may be improved, based on the mechanical physical properties required in the present invention, and the yellowness may be improved, as the polyamideimide-based film. In addition, the tensile modulus of the polyamideimide-based film may be improved to improve the mechanical strength of the hard coating film and to further improve the dynamic bending property.

By using the fluorine-based aromatic diamine as such, the optical properties of the polyamideimide-based film may be improved, and the yellowness may be improved.

As the aromatic dianhydride, at least one or two or more of 4,4'-hexafluoroisopropylidene diphthalic anhydride (6FDA) and biphenyltetracarboxylic dianhydride (BPDA), oxydiphthalic dianhydride (ODPA), sulfonyl diphthalic anhydride (SO2DPA), (isopropylidenediphenoxy) bis(phthalic anhydride)(6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(3,4-carboxylphenyl) dimethyl silane dianhydride (SiDA), and bis(dicarboxyphenoxy) diphenyl sulfide dianhydride (BDSDA) may be used, but the present invention is not limited thereto.

As an example of the cycloaliphatic dianhydride, any one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-en-2,3,5,6-tetracarboxylic dianhydride (BTA), bicyclooxtene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof may be used.

In an exemplary embodiment of the present invention, when the amide structure is formed in the polymer chain by the aromatic diacid dichloride, not only optical physical properties but also in particular, mechanical strength including the modulus may be greatly improved, and also the dynamic bending property may be further improved.

As the aromatic diacid dichloride, a mixture of two or more selected from the group consisting of isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof may be used, but the present invention is not limited thereto.

Hereinafter, a method of preparing a polyamideimide film will be illustrated.

In an exemplary embodiment of the present invention, the polyamideimide film may be prepared by applying a "polyamideimide resin solution" including a polyamideimide resin and a solvent on a substrate, and then performing drying or drying and stretching. That is, the polyamideimide film may be prepared by a solution casting method.

As an example, the polyamideimide film may be prepared by including the following steps: reacting a fluorine-based aromatic diamine and an aromatic diacid dichloride to prepare an oligomer, reacting the thus-prepared oligomer with the fluorine-based aromatic diamine, an aromatic dianhydride, and a cycloaliphatic dianhydride to prepare a polyamic acid solution, imidizing the polyamic acid solution to prepare a polyamideimide resin, and applying a polyamideimide solution in which the polyamideimide resin is dissolved in an organic solvent to form a film.

In the process of preparing a film, as long as the chlorine content of the present invention may be adjusted by 5 to 33 ppm by a step of application, drying or stretching, a step of drying after stretching, and the like, the means thereof is not particularly limited.

Hereinafter, each step will be described in more detail, taking a case of preparing a block polyamideimide film based on Example 1, as an example.

First, a step of preparing an oligomer using a diacid dichloride as a monomer may include reacting a fluorine-based aromatic diamine and an aromatic diacid dichloride in a reactor and purifying and drying the obtained oligomer.

In this case, the fluorine-based aromatic diamine may be introduced at a mole ratio of 1.01 to 2 with respect to the aromatic diacid dichloride to prepare an amine-terminated polyamide oligomer monomer. A molecular weight of the oligomer monomer is not particularly limited, but for example, when the weight average molecular weight is in a range of 1000 to 3000 g/mol, better physical properties may be obtained. Here, a side reaction may be suppressed by polymerizing the oligomer in the presence of pyridine to prepare a resin having better physical properties.

A representative example of the diacid dichloride includes aromatic carbonyl halides such as terephthaloyl chloride or isophthaloyl chloride.

In addition, a method of lowering a chlorine element content after preparing the oligomer may include a step of introducing the oligomer to methanol, water, and the like and washing the oligomer several times, or a method of easily lowering a chlorine content by thin film drying upon drying or the like may be adopted, but the means is not particularly limited. In addition, the chlorine content is adjusted to prepare an oligomer, and the oligomer may be washed by a solvent and a non-solvent, alternately, to lower the chlorine content. In addition, vacuum drying may be performed after washing at 60° C. or lower, more preferably 40 to 60° C. for 5 hours or more, specifically 5 to 10 hours to prepare a resin which is further less yellowed.

When a method of further using a scavenger such as an amine, a method of using a salt solution, or the like is used in the present invention, it was found that a chlorine element content may be lowered, but it is impossible to adjust the content to 5 to 33 ppm which is desired in the present invention, and also even if possible, according to the study of the present inventors, the additional compound is not completely removed and further causes a side reaction in a process of polyimidization, so that a yellow index change rate may not be maintained at the level of the present invention, and thus, those methods may not be used in the window cover film.

The organic solvent used for the polymerization reaction in the present invention may be, as an example, any one or two or more polar solvents selected from dimethylacetamide (DMAc), N-methyl-2-pyrrolidone (NMP), dimethylformamide (DMF), dimethylsulfoxide (DMSO), ethylcellosolve, methylcellosolve, acetone, ethylacetate, m-cresol, and the like.

More specifically, in the present invention, the fluorine-based aromatic diamine and the aromatic diacid dichloride are reacted to prepare an intermediate in the form of an oligomer including an amide unit, and then the oligomer is reacted with the fluorine-based aromatic diamine, the aromatic dianhydride, and the cycloaliphatic dianhydride to prepare a polyamic acid solution, thereby preparing a polyamideimide-based resin in which the amide intermediate is uniformly distributed.

In an exemplary embodiment of the present invention, a weight average molecular weight of the polyamideimide resin is not particularly limited, but may be 200,000 g/mol or more, preferably 300,000 g/mol or more, and more preferably 300,000 to 400,000 g/mol. Within the range, excellent dynamic bending properties without occurrence of cracks may be provided even in the case in which repetitive bending is applied, while mechanical physical properties are better, and thus, the range is preferred, but the present invention is not necessarily limited thereto.

As such, the amide intermediate is uniformly distributed in the entire film, whereby mechanical properties are excellent, optical properties are excellent, and coatability and coating uniformity of a coating composition used in a post-coating process of the hard coating layer or the like are further improved on the entire area of the film to further improve the optical physical properties of the final window cover film, and thus, a film having excellent optical properties without occurrence of an optical stain such as rainbow and mura may be provided.

The imidization step in the present invention may be performed by chemical imidization, and more preferably, by chemical imidization of a polyamic acid solution using pyridine and an acetic anhydride. The imidization may be performed at a low reaction temperature of 150° C. or lower, preferably 100° C. or lower, and specifically 50 to 150° C. using an imidization catalyst and a dehydrating agent, but the present invention is not limited thereto. In addition, as the dehydrating agent, any one or two or more selected from an acetic anhydride, a phthalic anhydride, a maleic anhydride, and the like may be used, but the present invention is not necessarily limited thereto.

In addition, an additive such as a flame retardant, an adhesion improver, inorganic particles, an antioxidant, a UV inhibitor, and a plasticizer may be mixed with a polyamic acid solution to prepare the polyamideimide resin.

In addition, after imidization, the resin is purified using a solvent to obtain a solid content, which is dissolved in a solvent to obtain a polyamideimide solution. The solvent may include N,N-dimethyl acetamide (DMAc) and the like, but is not limited thereto.

The step of forming a film from the polyamideimide solution is performed by applying the polyamideimide solution on a substrate, and then drying the solution in a drying step divided into a dry area. In addition, stretching may be performed before or after the drying, and a heat treatment step may be further performed after the drying or stretching step. As the substrate, for example, glass, stainless, a film, or the like may be used, but the present invention is not limited thereto. Application may be performed by a die coater, an air knife, a reverse roll, a spray, a blade, casting, gravure, spin coating, and the like.

In the present invention, the chlorine content of the polyamideimide film may be further adjusted in a step such as stretching, drying, and heat treatment, and the means is not limited to any one thereof.

<Window Cover Film>

Another exemplary embodiment of the present invention provides a window cover film including: the polyamideimide film described above; and a coating layer formed on the polyamideimide film.

When a hard coating layer is laminated on the polyamideimide film having a solubility in a specific range, a window cover film having a haze change rate of 1.5% or less and significantly improved visibility may be provided.

In an exemplary embodiment of the present invention, the window cover film may satisfy all physical properties of a light transmittance of 5% or more as measured at 388 nm in accordance with ASTM D1746, a total light transmittance of 87% or more, 88% or more, or 89% or more as measured at 400 to 700 nm, a haze in accordance with ASTM D1003 of 1.5% or less, 1.2% or less, or 1.0% or less, a yellow index in accordance with ASTM E313 of 1.5 or less, 1.0 or less, and specifically 0.1 to 1.5, and a value of 2.0 or less, 1.5 or less, or 1.2 or less.

In an exemplary embodiment of the present invention, the coating layer is for imparting functionality of the window cover film, and may be variously applied depending the purpose.

Specifically, for example, the coating layer may include any one or more layers selected from a hard coating layer, a restoration layer, a shock spread layer, a self-cleaning layer, an anti-fingerprint layer, an anti-scratch layer, a low-refractive layer, a shock absorption layer, and the like, but is not limited thereto.

Even when various coating layers as described above are formed on the polyamideimide film, a window cover film having excellent display quality, high optical properties, and, in particular, a significantly reduced rainbow phenomenon, may be provided.

In an exemplary embodiment of the present invention, specifically, the coating layer may be formed on one surface or both surfaces of the polyamideimide film. For example, the coating layer may be disposed on an upper surface of the polyamideimide film, or disposed on each of an upper surface and a lower surface of the polyamideimide film. The coating layer may protect the polyamideimide film having excellent optical and mechanical properties from external physical or chemical damage.

In an exemplary embodiment of the present invention, the coating layer may have a solid content of 0.01 to 200 $g/m^2$, based on a total area of the polyamideimide film. Preferably, the solid content may be 20 to 200 $g/m^2$, based on the total area of the polyamideimide film. By providing the basis weight described above, surprisingly, the film may not cause a rainbow phenomenon while maintaining functionality to implement excellent visibility.

In an exemplary embodiment of the present invention, specifically, the coating layer may be formed by applying the coating layer in the state of a composition for forming a coating layer including a coating solvent on the polyamideimide film. The coating solvent is not particularly limited, but preferably, may be a polar solvent. For example, the polar solvent may be any one or more solvents selected from an ether-based solvent, a ketone-based solvent, an alcohol-based solvent, an amide-based solvent, a sulfoxide-based solvent, an aromatic hydrocarbon-based solvent, and the like. Specifically, the polar solvent may be any one or more solvents selected from dimethylacetamide (DMAc), N-methyl-2-pyrrolidone (NMP), dimethylformamide (DMF), dimethylformsulfoxide (DMSO), acetone, diethylacetate, propylene glycol methyl ether, m-cresol, methanol, ethanol, isopropanol, butanol, 2-methoxyethanol, methylcellosolve, ethylcellosolve, methyl ethyl ketone, methyl butyl ketone, methyl isobutyl ketone, methyl phenyl ketone, diethyl ketone, dipropyl ketone, cyclohexanone, hexane, heptane, octane, benzene, toluene, xylene, and the like.

In an exemplary embodiment of the present invention, as a method of forming the coating layer by applying the composition for forming a coating layer on the polyamideimide film, any one or more methods selected from, for example, a spin coating method, a dipping method, a spraying method, a die coating method, a bar coating method, a roll coater method, a meniscus coating method, a flexo printing method, a screen printing method, a bead coating method, an air knife coating method, a reverse roll coating method, a blade coating method, a casting coating method, a gravure coating method, and the like, may be used, but the present invention is not limited thereto.

Preferably, in an exemplary embodiment of the present invention, the coating layer may be a hard coating layer. The hard coating layer may include any one or more selected from organic materials, inorganic materials, and the like. For example, the organic material includes carbon, and may include mainly carbon and any one or more selected from nonmetallic elements such as hydrogen, oxygen, and nitrogen. The inorganic material refers to a material other than the organic material, and may include any one or more selected from metal elements such as alkali earth metals, alkali metals, transition metals, post transition metals, and metalloids. As an example, the inorganic material may include carbon dioxide, carbon monoxide, diamond, carbonates, and the like, as a subject for exception.

In an exemplary embodiment of the present invention, the hard coating layer may be a single layer of an organic material layer or an inorganic material layer, or a mixed layer of an organic material and an inorganic material, and though it is not particularly limited, preferably, may include 10 to 90 wt % of the organic material and 10 to 90 wt % of the inorganic material. Preferably, the hard coating layer may include 40 to 80 wt % of the organic material and 20 to 60 wt % of the inorganic material. Even in the case in which the hard coating layer including the organic material and the inorganic material is formed as described above, bonding with the polyamideimide film is excellent, no distortion by light occurs, and, in particular, an effect of improving a rainbow phenomenon is excellent.

According to an exemplary embodiment of the present invention, though not particularly limited, the hard coating layer may be a layer including, for example, any one or more polymers selected from an acryl-based polymer, a silicon-based polymer, an epoxy-based polymer, a urethane-based polymer, and the like.

Specifically, the hard coating layer prevents deterioration of optical properties when being formed on the polyamideimide film, and may be a layer formed from a composition for forming a coating layer including an epoxysilane resin for improving a surface hardness. Specifically, the epoxysilane resin may be a siloxane resin including an epoxy group. The epoxy group may be a cyclic epoxy group, an aliphatic epoxy group, an aromatic epoxy group, or a mixture thereof. The siloxane resin may be a polymer compound in which a silicon atom and an oxygen atom form a covalent bond.

Preferably, for example, the epoxy siloxane resin may be a silsesquioxane resin. Specifically, the epoxy siloxane resin may be a compound in which a silicon atom of the silsesquioxane compound is directly substituted by an epoxy group or the substituent on the silicon atom is substituted by an epoxy group. As a non-limiting example, the epoxy siloxane resin may be a silsesquioxane resin substituted by a 2-(3,4-epoxycyclohexyl) group or a 3-glycidoxy group.

The epoxy siloxane resin may be produced from alkoxysilane having an epoxy group alone or hydrolysis and condensation reactions of between alkoxysilane having an epoxy group and another kind of alkoxysilane, in the presence of water. In addition, the epoxysilane resin may be formed by polymerizing a silane compound including an epoxycyclohexyl group.

For example, the alkoxysilane compound having an epoxy group may be any one or more selected from 2-(3,4-epoxycyclohexyl) ethyltrimethoxysilane, 2-(3,4-epoxycyclohexyl)ethyltriethoxysilane, 3-glycidoxypropyltrimethoxysilane, and the like.

In an exemplary embodiment of the present invention, the epoxy siloxane resin may have a weight average molecular weight of 1,000 to 20,000 g/mol, but is not limited thereto. When the epoxy siloxane resin has the weight average molecular weight in the above range, it has an appropriate viscosity, thereby improving flowability, coatability, curing reactivity, and the like of the composition for forming a coating layer, and improving the surface hardness of the hard coating layer.

In an exemplary embodiment of the present invention, the epoxy siloxane resin may be included at 20 to 65 wt %, preferably to 60 wt %, based on a total weight of the composition for forming a coating layer. When the epoxy siloxane resin is included within the above range, the surface hardness of the hard coating layer may be improved, and uniform curing may be derived to prevent physical defects such as cracks due to partial overcuring.

In an exemplary embodiment of the present invention, the composition for forming a coating layer may further include a crosslinking agent and an initiator.

Specifically, the crosslinking agent is not particularly limited as long as it may form a crosslink with the epoxy siloxane resin to solidify the composition for forming a coating layer and improve a hardness of the hard coating layer, but the crosslinking agent may be, for example, any one or more selected from (3,4-epoxycyclohexyl)methyl-3', 4'-epoxycyclohexanecarboxylate, digylcidyl 1,2-cyclohexanedicarboxylate, 2-(3,4-epoxycyclohexyl-5,5-spiro-3,4-epoxy)cyclohexane-meta-dioxane, bis(3,4-epoxycyclohexylmethyl)adipate), bis(3,4-epoxy-6-methylcyclohexyl) adipate, 3,4-epoxy-6-methylcyclohexylmethyl-3', 4'-epoxy-6'-methylcyclohexanecarboxylate, 1,4-cyclohexanedimethanol bis(3,4-epoxycyclohexanecarboxylate), ethylenebis(3,4-epoxycyclohexanecarboxylate), 3,4-epoxycyclohexylmethyl(meth)acrylate, bis(3,4-epoxycyclohexylmethyl)adipate, 4-vinylcyclohexenedioxide, vinylcyclohexenemonoxide, 1,4-cyclohexanedimethanol diglycidyl ether, 2,2'-((1-methylethylidene)bis(cyclohexane-4,1-diyloxymethylene)) bisoxirane, and the like. Preferably, the crosslinking agent may be any one or more selected from (3,4-epoxycyclohexyl)methyl-3', 4'-epoxycyclohexanecarboxylate, bis(3,4-epoxycyclohexylmethyl)adipate), and the like including a compound in which two 3,4-epoxycyclohexyl groups are connected.

In an exemplary embodiment of the present invention, the content of the crosslinking agent is not particularly limited, and for example, may be 5 to 150 parts by weight, based on 100 parts by weight of the epoxy siloxane resin. In addition, according to an exemplary embodiment of the present invention, the crosslinking agent may be included at 3 to 30 wt %, preferably 5 to 20 wt %, based on the total weight of the composition for forming a coating layer. Within the range, the coatability and curing reactivity of the composition for forming a coating layer may be improved.

In an exemplary embodiment of the present invention, the initiator may be a photoinitiator or a thermal initiator. Preferably, the initiator may be a photoinitiator, and for example, the photoinitiator may include a photo-cationic initiator. The photo-cationic initiator may initiate polymerization of the epoxy siloxane resin and an epoxy-based monomer.

Specifically, the photo-cationic initiator may be any one or more selected from onium salts, organic metal salts, and the like, but is not limited thereto. For example, the photo-cationic initiator may be any one or more selected from a diaryliodonium salt, a triarylsulfonium salt, an aryldiazonium salt, an iron-arene complex, and the like, but is not limited thereto.

In an exemplary embodiment of the present invention, the content of the photoinitiator is not particularly limited, and for example, may be 1 to 15 parts by weight, based on 100 parts by weight of the epoxy siloxane resin. In addition, according to an exemplary embodiment of the present invention, the photoinitiator may be included at 0.1 to 10 wt %, and preferably 0.3 to 5 wt %, based on the total weight of the composition for forming a coating layer. When the content of the photoinitiator is within the above range, curing efficiency of the hard coating layer is excellent and deterioration of the physical properties due to residual components after curing may be prevented.

In an exemplary embodiment of the present invention, the composition for forming a coating layer may further include any one or more additives selected from fillers, slip agents, photostabilizers, thermal polymerization prohibition agents, leveling agents, lubricants, antifoulants, thickeners, surfactants, antifoaming agents, anti-static agents, dispersants, initiators, coupling agents, antioxidants, UV stabilizers, colorants, and the like, but is not limited thereto.

More specifically, the hard coating layer may further include inorganic particles for imparting hardness.

The inorganic particles may be preferably silica, and more preferably surface-treated silica, but are not limited thereto. Here, surface treatment may be inclusion of a functional group capable of reacting with the crosslinking agent described above.

According to an exemplary embodiment, the inorganic particles may have an average particle diameter of 1 to 500 nm, and preferably 10 to 300 nm, but are not limited thereto.

When a hard coating layer described above is formed on the conventional polyamideimide film, a rainbow phenomenon was not able to be avoided by distortion of light. However, the polyamideimide film according to the present invention hardly causes a rainbow phenomenon even in the case in which the hard coating layer as described above is formed, and may implement excellent visibility.

In an exemplary embodiment of the present invention, the window cover film may further include a substrate layer. The substrate layer may be formed on the other surface of the polyamideimide film on which the coating layer is not formed.

In an exemplary embodiment of the present invention, the polyamideimide film may be laminated on the substrate layer after being produced into a film, or may be laminated after applying a polyamic acid resin composition which is a precursor of the polyamideimide film to be coated, but is not particularly limited as long as it may form a lamination configuration described above.

In an exemplary embodiment of the present invention, the substrate layer is not particularly limited as long as it is a substrate film of a commonly used window cover film, but for example, may include any one or more selected from an ester-based polymer, a carbonate-based polymer, a styrene-based polymer, an acryl-based polymer, and the like. Specifically, for example, the substrate layer may include any one or more selected from polyethylene terephthalate, polyethylene naphthalate, polybutylene terephthalate, polybutylene naphthalate, polycarbonate, polystyrene, polymethylmethacrylate, and the like, but is not limited thereto.

In an exemplary embodiment of the present invention, the substrate layer may be a single layer or a multiple layer in which two or more layers are laminated. Specifically, the substrate layer may include an optical adhesive layer on an interface of two or more substrate films and be laminated.

According to an exemplary embodiment of the present invention, the substrate layer may have a thickness of 50 to 300 μm. The thickness may be preferably 100 to 300 μm, and more preferably 150 to 250 μm. By having the thickness described above, the substrate layer may satisfy mechanical physical properties, and also significantly reduce a distortion phenomenon of light, when laminating the polyamideimide film.

In an exemplary embodiment of the present invention, specifically, for example, the optical adhesive layer may include any one or more selected from an optical clear adhesive (OCA), an optical clear resin (OCR), a pressure sensitive adhesive (PSA), and the like, but is not limited thereto.

In an exemplary embodiment of the present invention, the window cover film may further include a second optical adhesive layer on an interface between the substrate layer and the polyamideimide film.

Specifically, the second optical adhesive layer formed on the interface between the substrate layer and the polyamideimide film may be a material which is the same as or different from the optical adhesive layer in the substrate layer described above, and for example, may be formed to have a thickness of 20 to 120 μm. Preferably, the thickness may be 20 to 80 μm. When the thickness is formed in the above range, the window cover film may implement overall excellent optical properties and a light distortion improvement effect.

In an exemplary embodiment of the present invention, the window cover film may have a high surface hardness, have excellent flexibility, be lighter than tempered glass, and have excellent durability against deformation, and thus, is excellent as a window substrate on the outermost surface of a flexible display panel.

Another exemplary embodiment of the present invention provides a display device including: a display panel and the window cover film described above formed on the display panel.

In an exemplary embodiment of the present invention, the display device is not particularly limited as long as it belongs to a field requiring excellent optical properties, and may be provided by selecting a display panel appropriate therefor. Preferably, the window cover film may be applied to a flexible display device, and specifically, for example, may be included in and applied to any one or more image displays selected from various image displays such as a liquid crystal display, an electroluminescence display, a plasma display, and a field emission display device and the like, but is not limited thereto.

The display device including the window cover film of the present invention described above has excellent display quality to be displayed and significantly decreased distortion caused by light, and thus, may have a significantly reduced rainbow phenomenon in which iridescent stain occurs and minimize user's eye strain with excellent visibility.

Hereinafter, the present invention will be described in more detail with reference to the Examples and Comparative Examples. However, the following Examples and Comparative Examples are only an example for describing the present invention in detail, and do not limit the present invention in any way.

Hereinafter, the physical properties were measured as follows:

1) Pencil Hardness

In accordance with JIS K 5400, a line of 20 mm was drawn at a speed of 120 mm/sec on a film using a load of 750 g for each hardness of a pencil (Mitsubishi) and this operation was repeated 5 times or more, and the pencil hardness was measured based on the case in which two or more scratches occurred.

2) Modulus/Elongation at Break

According to ASTM D882, the elongation at break was measured using UTM 3365 available from Instron, under the condition of pulling a polyamideimide film having a length of 50 mm and a width of 10 mm at 50 mm/min at 25° C.

The thickness of the film was measured and the value was input to the instrument. The unit of the modulus was GPa and the unit of the elongation at break was %.

3) Light Transmittance

In accordance with the standard of ASTM D1746, a total light transmittance was measured at the entire wavelength area of 400 to 700 nm using a spectrophotometer (from Nippon Denshoku, COH-400) and a single wavelength light transmittance was measured at 388 nm using UV/Vis (Shimadzu, UV3600), on a film having a thickness of 50 μm. The unit was %.

4) Haze

In accordance with the standard of ASTM D1003, the haze was measured based on a film having a thickness of 50 μm, using a spectrophotometer (from Nippon Denshoku, COH-400). The unit was %.

5) Weight Average Molecular Weight (Mw) and Polydispersity Index (PDI)

The weight average molecular weight and the polydispersity index of the produced films were measured as follows.

First, a film sample was dissolved in a DMAc eluent containing 0.05 M LiBr and used as a sample. Measurement was performed by using GPC (Waters GPC system, Waters 1515 isocratic HPLC Pump, Waters 2414 Refractive Index detector), connecting Olexis, polypore, and mixed D columns as a GPC column, using a DMAc solution as a solvent, and using polymethylmethacrylate (PMMA STD) as a standard, and analysis was performed at a flow rate of 1 ml/min at 35° C.

6) Yellow Index (YI) and b* Value

The yellow index and the b* value were measured using a colorimeter (from HunterLab, ColorQuest XE), based on a film having a thickness of 50 μm, accordance with the standard of ASTM E313.

7) UV Weathering Accelerated Test

A process of irradiating 0.55 W/m$^2$ of UVA at 340 nm at 40° C. for 20 hours and then blocking UVA for 4 hours was repeated three times, and the yellow index was measured according to ASTM E313. That is, a process of irradiating 0.55 W/m$^2$ of UVA at 340 nm at 40° C. for 20 hours, blocking UVA at 40° C. for 4 hours, and then performing irradiation and blocking again was repeated a total of three times.

A yellow index change rate was calculated from the following equation:

ΔYI=yellow index after UV weathering accelerated test−initial yellow index before UV weathering accelerated test 8) Method of Measuring Chlorine Content The weight of a 20 mL glass vial was recorded, 0.05 g ±0.02 g of a sample was added thereto, and the weight was recorded. 5 mL ±1 mL of a dimethylformamide (DMF) solution was added thereto, the weight was recorded, and the vial was sealed with Para Film. The vial was placed in a shaker and shaken for 30 minutes to completely dissolve the sample. The weight of a 20 mL glass vial was separately recorded, 10 mL +2 mL of distilled water was added thereto, the weight was recorded again, 5 mL +1 mL of a DMF solution in which the sample was dissolved was slowly added thereto, vortex mixing was performed, the weight was recorded again, the vial was placed in the shaker and shaken for about 3 hours or more, and centrifugation was performed at 1000 rpm with a centrifuge to separate a precipitate and an aqueous layer. The sample of the aqueous layer was filtrated using a 0.2 µm PTFE syringe filter to obtain an aqueous solution, which was used in analysis with ion chromatography. Standard solutions for each concentration of chlorine were used to determine a calibration curve using a concentration to area ratio, and the above sample was analyzed to determine the concentration with the area.

EXAMPLE 1

<Production of Polyamideimide-Based Film>

Terephthaloyl dichloride (TPC) and 2,2'-bis(trifluoromethyl)-benzidine (TFMB) were added to a mixed solution of dichloromethane and pyridine in a reactor, and stirring was performed at 25° C. for 2 hours under a nitrogen atmosphere. Here, a mole ratio of TPC:TFMB was 300:400, and a solid content was adjusted to 10 wt %. Thereafter, the reactant was precipitated in an excessive amount of methanol and filtered, and washed with water three times to obtain a solid content, which was dried under vacuum at 50° C. for 6 hours to obtain an oligomer, and the prepared oligomer had a formula weight (FW) of 1670 g/mol.

N,N-dimethylacetamide (DMAc), 100 mol of the oligomer, and 28.6 mol of 2,2'-bis(trifluoromethyl)-benzidine (TFMB) were added to the reactor and sufficient stirring was performed. After confirming that the solid raw material was completely dissolved, fumed silica (surface area of 95 m$^2$/g, <1 µm) was added to DMAc at a content of 1000 ppm relative to the solid content, and added to the reactor after being dispersed using ultrasonic waves. 64.3 mol of cyclobutanetetracarboxylic dianhydride (CBDA) and 64.3 mol of 4,4'-hexafluoroisopropylidene diphthalic anhydride (6FDA) were subsequently added, sufficient stirring was performed, and the mixture was polymerized at 40° C. for 10 hours. The solid content was 20% at this time. Subsequently, each of pyridine and acetic anhydride was added sequentially at 2.5-fold relative to the total content of dianhydride, and stirring was performed at 60° C. for 12 hours.

After the polymerization was finished, the polymerization solution was precipitated in an excessive amount of methanol and filtered to obtain a solid content, which was dried under vacuum at 50° C. for 8 hours to obtain polyamideimide powder. The powder was diluted and dissolved at 20 wt % in DMAc to prepare a polyamideimide-based resin solution.

The polyimide-based resin solution was applied on a glass substrate using an applicator, dried at 80° C. for 30 minutes and 100° C. for 1 hour, and cooled to room temperature to produce a film. Thereafter, a stepwise heat treatment was performed at a heating rate of 20° C./min at 100 to 200° C. and 250 to 300° C. for 2 hours.

The thus-produced polyamideimide film had a thickness of 48 µm, a chlorine content of 33 ppm, a total light transmittance of 90.1%, a haze of 0.33%, a yellow index (YI) of 1.7, a b* value of 1.1, a modulus of 7.3 GPa, an elongation at break of 24.1%, a weight average molecular weight of 325,000 g/mol, a polydispersity index (PDI) of 2.2, and a pencil hardness of HB/750 g. After the UV weathering accelerated test, it was confirmed that the yellow index was 4.7, which was increased by 3 as compared with the initial value.

EXAMPLE 2

A film was produced in the same manner as in Example 1, except that a mole ratio of TPC:TFMB was 200:400.

The thus-produced polyamideimide film had a thickness of 52 µm, a chlorine content of 14 ppm, a total light transmittance of 90.4%, a haze of 0.28%, a yellow index (YI) of 1.5, a b* value of 1.0, a modulus of 8.5 GPa, an elongation at break of 20.5%, a weight average molecular weight of 310,000 g/mol, a polydispersity index (PDI) of 2.6, and a pencil hardness of HB/750 g. After the UV weathering accelerated test, it was confirmed that the yellow index was 4.3, which was increased by 2.8 as compared with the initial value.

EXAMPLE 3

A film was produced in the same manner as in Example 1, except that a mole ratio of TPC:TFMB was 120:400.

The physical properties of the thus-produced polyamideimide film were a thickness of 50 µm, a chlorine content of 25 ppm, a total light transmittance of 90.3%, a haze of 0.31%, a yellow index (YI) of 1.8, a b* value of 1.2, a modulus of 7.9 GPa, an elongation at break of 19.5%, a weight average molecular weight of 300,000 g/mol, a polydispersity index (PDI) of 2.1, and a pencil hardness of HB/750 g. After the UV weathering accelerated test, it was confirmed that the yellow index was 4.8, which was increased by 3 as compared with the initial value.

EXAMPLE 4

A film was produced in the same manner as in Example 1, except that 100 mol of the oligomer and 28.6 mol of 2,2'-bis(trifluoromethyl)-benzidine (TFMB) were used and 128.6 mol of 4,4'-hexafluoroisopropylidene diphthalic anhydride (6FDA) was used in the preparation of polyamideimide.

The thus-produced polyamideimide film had a thickness of 42 µm, a chlorine content of 6 ppm, a total light transmittance of 90.5%, a haze of 0.26%, a yellow index (YI) of 1.7, a b* value of 1.2, a modulus of 7.9 GPa, an elongation at break of 24.5%, a weight average molecular weight of 340,000 g/mol, a polydispersity index (PDI) of 2.1, and a pencil hardness of HB/750 g. After the UV weathering accelerated test, it was confirmed that the yellow index was 4.6, which was increased by 2.9 as compared with the initial value.

Comparative Example 1

A reactor was filled with N,N-dimethylacetamide (DMAc) under a nitrogen atmosphere, 100 mol of 2,2'-bis (trifluoromethyl)-benzidine (TFMB) was added thereto, sufficient stirring was performed, 40 mol of 4,4'-hexafluoroisopropylidene diphthalic anhydride (6FDA) was added thereto, and sufficient stirring was performed until the materials were dissolved. Thereafter, 40 mol of cyclobutanetetracarboxylic dianhydride (CBDA) was added and sufficient stirring was performed until the materials were dissolved. Thereafter, 20 mol of terephthaloyl dichloride (TPC) was introduced and stirring was performed for 6 hours to carry out dissolution and reaction, thereby preparing a polyamic acid resin composition. Each monomer was adjusted to have a solid content of 6.5 wt %. Pyridine and acetic anhydride were sequentially added to the composition at 2.5-fold of the moles of the total dianhydrides, and were stirred at 60 °C. for 1 hour. Thereafter, the solution was precipitated in an excessive amount of methanol and filtered to obtain a solid content, which was dried under vacuum at 50° C. for 6 hours to obtain polyamideimide powder. The powder was diluted and dissolved at 20 wt % in DMAc to prepare a composition.

The composition was cast on a glass substrate to form a film, which was then separated from the substrate. The thus-produced polyamideimide film had a thickness of 42 μm, a chlorine content of 48 ppm, a yellow index (YI) of 3.5, and a yellow index after a UV weathering accelerated test of 9, which was increased by 5.5 as compared with the initial value. In addition, the produced film had a modulus of 4 GPa and an elongation at break of 15.5%, which was low as compared with Example 1. In addition, it was confirmed that the film had a weight average molecular weight of 260,000 g/mol, a pencil hardness of Hb/750 g, a total light transmittance of 87.5%, and a haze of 1.5%.

COMPARATIVE EXAMPLE 2

A film was produced in the same manner as in Example 1, except that a process of mixing a polyamideimide-based resin solution with an excessive amount of water, performing filtration to obtain a resin, dissolving the obtained resin in a DMAc solution again, and precipitating the resin in an excessive amount of water was performed 5 times to obtain polyamideimide, which was dissolved in DMAc to produce a film.

The thus-produced film had a thickness of 52 μm, a chlorine content of 4 ppm, a total light transmittance of 90.1%, a haze of 0.8%, a yellow index (YI) of 3, a b* value of 1.2, a modulus of 5 GPa, and an elongation at break of 15%. After the UV weathering accelerated test, it was confirmed that the yellow index was 8, which was increased by 5.3 as compared with the initial value.

COMPARATIVE EXAMPLE 3

A film was produced in the same manner as in Example 1, except that after the polyamic acid oligomer was prepared, the oligomer was precipitated in an excessive amount of methanol and filtered to obtain a solid content, which was dried in vacuum at 90° C. for 48 hours to obtain an oligomer. The obtained film had a thickness of 52 μm, a chlorine content of 68 ppm, a total light transmittance of 89.5%, a haze of 1.1%, a yellow index (YI) of 4, a b* value of 1.2, a modulus of 5.5 GPa, an elongation at break of 16%, a weight average molecular weight of 260,000 g/mol, and a pencil hardness of HB/750 g. After the UV weathering accelerated test, it was confirmed that the yellow index was 11, which was increased by 7 as compared with the initial value.

TABLE 1

| | Chlorine content (ppm) | Total light transmittance (%) | Haze (%) | Yellow index Initially | Yellow index After UV treatment | ΔYI | Modulus (GPa) | Elongation at break (%) |
|---|---|---|---|---|---|---|---|---|
| Example 1 | 33 | 90.1 | 0.33 | 1.7 | 4.7 | 3 | 7.3 | 24.1 |
| Example 2 | 14 | 90.4 | 0.28 | 1.5 | 4.3 | 2.8 | 8.5 | 20.5 |
| Example 3 | 25 | 90.3 | 0.31 | 1.8 | 4.8 | 3 | 7.9 | 19.5 |
| Example 4 | 6 | 90.5 | 0.26 | 1.7 | 4.6 | 2.9 | 7.9 | 24.5 |
| Comparative Example 1 | 48 | 87.5 | 1.5 | 3.5 | 9 | 5.5 | 4 | 15.5 |
| Comparative Example 2 | 4 | 90.1 | 0.8 | 3 | 8.3 | 5.3 | 5 | 15 |
| Comparative Example 3 | 68 | 89.5 | 1.1 | 4 | 11 | 7 | 5.5 | 16 |

The polyamideimide film according to an exemplary embodiment of the present invention has a high transmittance to visible light to have excellent transparency and has excellent mechanical physical properties and thermal resistance, and thus, may provide physical properties appropriate for use as a window cover film of a flexible display panel.

In addition, the polyamideimide film has a low yellow index of 4 or less and has a small change in the yellow index even in the case of long-term exposure to ultraviolet rays, while satisfying transparency and mechanical physical properties as described above, and thus, may provide a film having excellent weatherability.

Hereinabove, although the present invention has been described by specified matters and specific exemplary embodiments, they have been provided only for assisting in the entire understanding of the present invention. Therefore, the present invention is not by the specific matters limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A polyamideimide film comprising an amideimide structure derived from a dianhydride, a diamine, and an aromatic diacid dichloride,
   wherein the dianhydride comprises an aromatic dianhydride and a cycloaliphatic dianhydride, and 10 to 50 mol of the aromatic dianhydride and 10 to 60 mol of the cycloaliphatic dianhydride are included with respect to 100 mol of the diamine, wherein the diamine comprises a first fluorine-based aromatic diamine which forms an amine-terminated polyamide oligomer intermediate with the aromatic diacid dichloride in deriving the amideimide structure, wherein a chlorine content in the film is 5 to 33 ppm; an initial yellow index of the film is 2 or less; and a yellow index change amount ΔYI satisfies the following equation 1, the yellow index change amount being measured in accordance with UV weathering accelerated test ASTM E313 after repeating a process of irradiating 0.55 W/m² of ultraviolet A rays having a wavelength of 340 nm at 40° C. for 20 hours and then blocking ultraviolet A rays having a wavelength of 340 nm for 4 hours three times:

$$\Delta YI \leq 4 \qquad \text{[Equation 1]}$$

wherein ΔYI is the yellow index after a UV weathering accelerated test—the initial yellow index.

2. The polyamideimide film of claim 1, wherein the polyamideimide film has a modulus in accordance with ASTM D882 of 4 GPa or more and an elongation at break of 8% or more.

3. The polyamideimide film of claim 1, wherein the polyamideimide film has a light transmittance of 5% or more as measured at 388 nm in accordance with ASTM D1746, a total light transmittance of 87% or more as measured at 400 to 700 nm, a haze of 2.0% or less, and a b* value of 2.0 or less.

4. The polyamideimide film of claim 1, wherein the diamine comprises a second fluorine-based aromatic diamine.

5. The polyamideimide film of claim 1, wherein the cycloaliphatic dianhydride includes cyclobutanetetracarboxylic dianhydride (CBDA).

6. The polyamideimide film of claim 1, wherein a sum of the aromatic diacid dichloride and the dianhydride to the diamine has a mole ratio of 1:0.9 to 1.1.

7. The polyamideimide film of claim 1, wherein the polyamideimide film is formed of a block polyamideimide structure.

8. The polyamideimide film of claim 1, wherein the polyamideimide film has a thickness of 10 to 500 μm.

9. A window cover film comprising:
   the polyamideimide film of claim 1; and
   a coating layer formed on one surface or both surfaces of the polyamideimide film.

10. The window cover film of claim 9, wherein the coating layer is any one or more selected from a hard coating layer, an antistatic layer, an anti-fingerprint layer, an anti-fouling layer, an anti-scratch layer, a low-refractive layer, an antireflective layer, and a shock absorption layer.

11. A flexible display panel comprising the polyamideimide film of claim 1.

* * * * *